Figure 1:
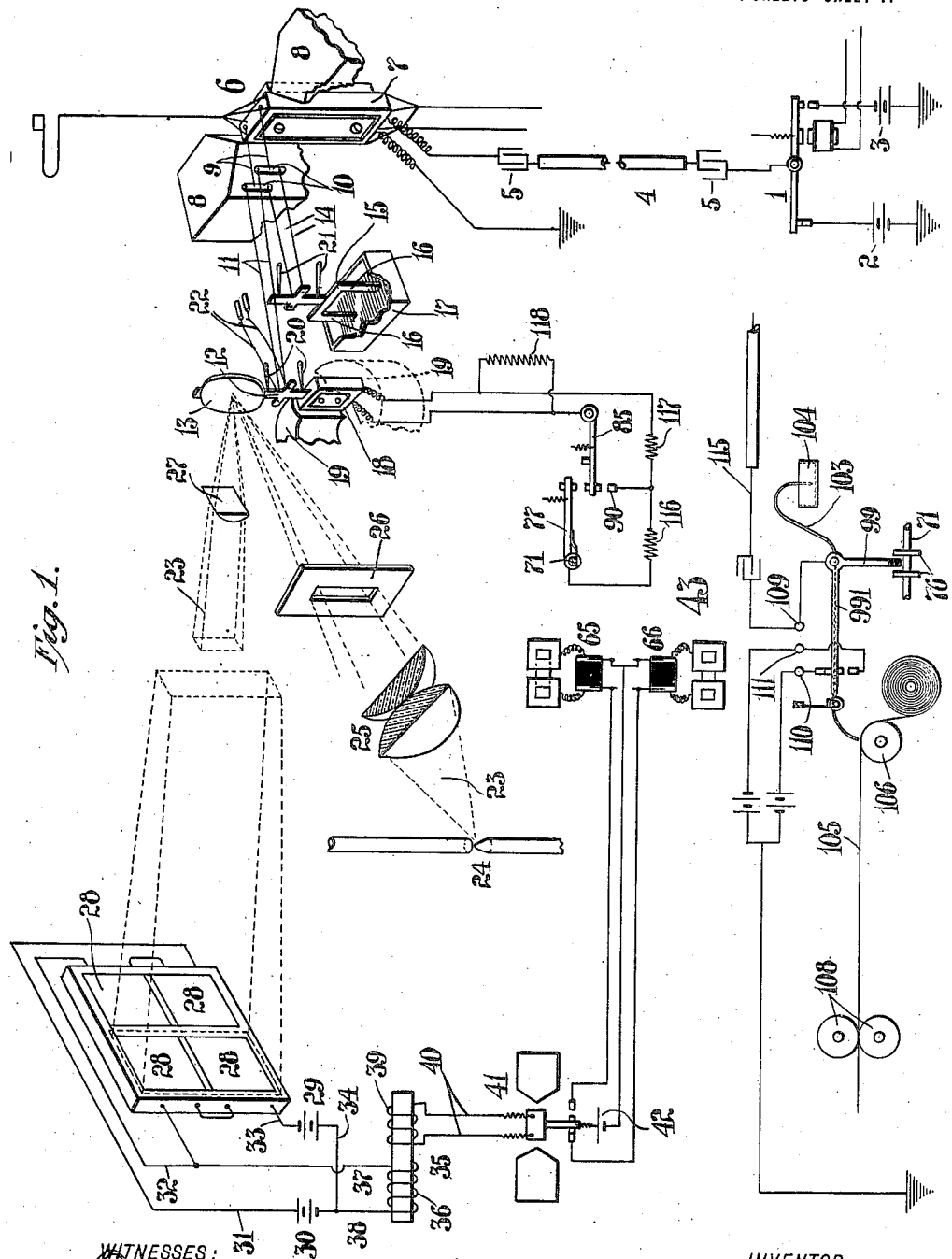

T. B. DIXON.
TELEGRAPHY.
APPLICATION FILED AUG. 22, 1910. RENEWED JAN. 24, 1916.

1,197,461.

Patented Sept. 5, 1916.
4 SHEETS—SHEET 2.

WITNESSES:

INVENTOR
Thomas B. Dixon
BY
ATTORNEY

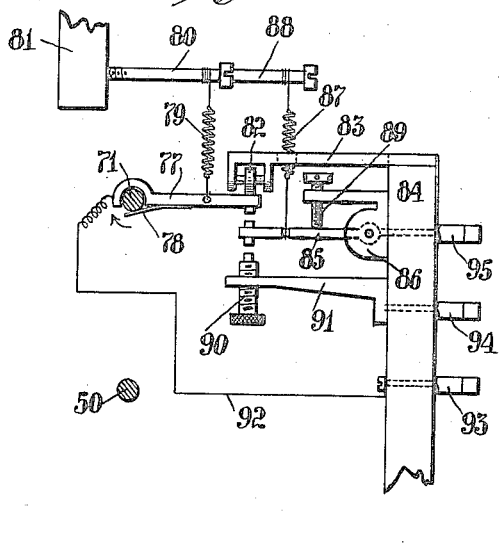
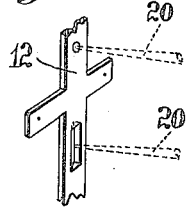
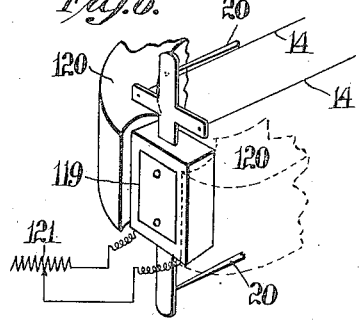
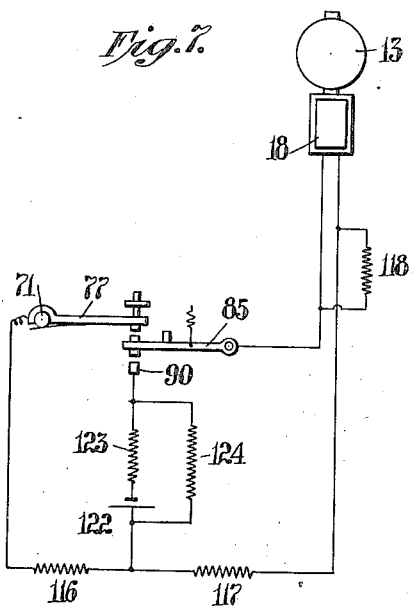
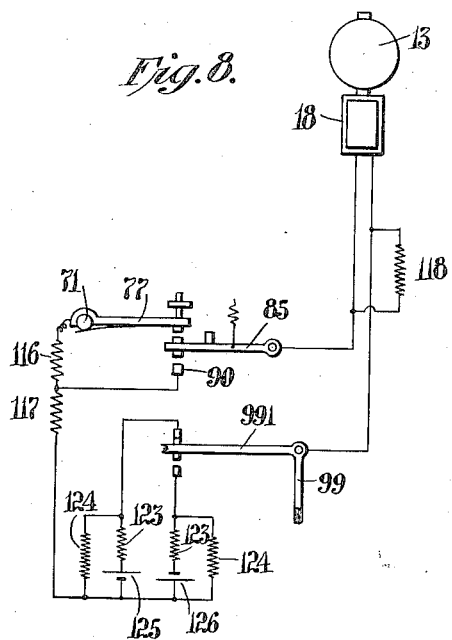

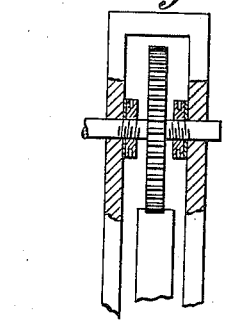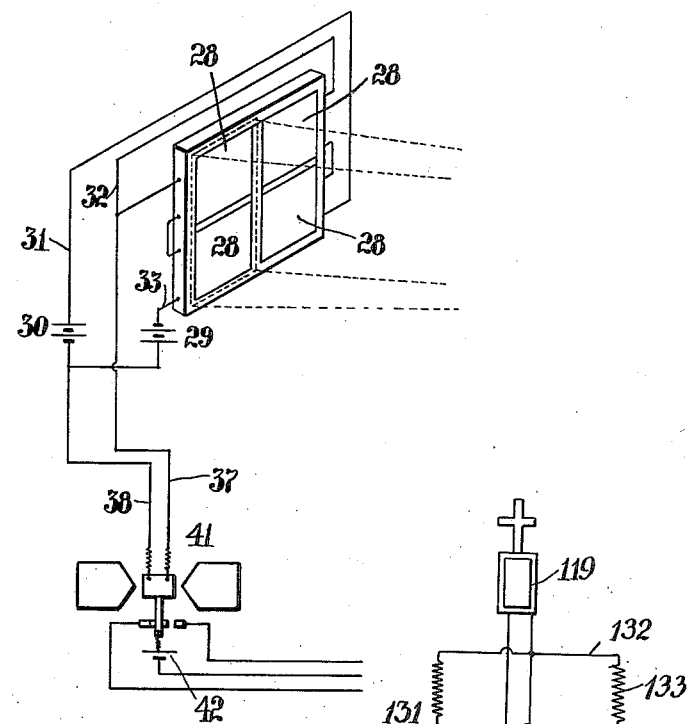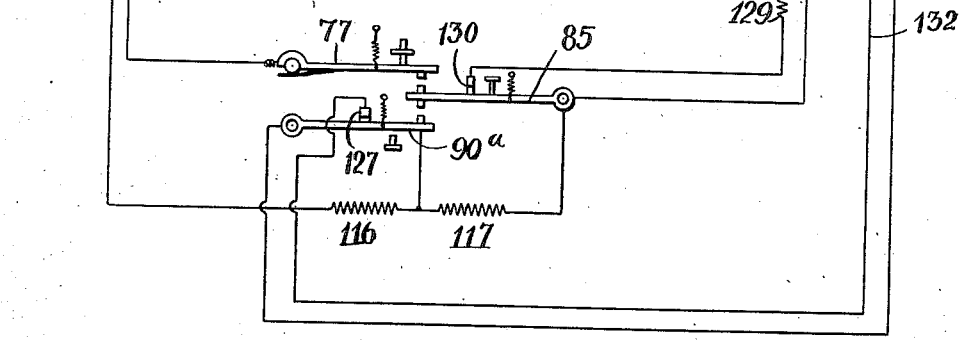

UNITED STATES PATENT OFFICE.

THOMAS B. DIXON, OF NEW YORK, N. Y.

TELEGRAPHY.

1,197,461. Specification of Letters Patent. Patented Sept. 5, 1916.

Application filed August 22, 1910, Serial No. 578,277. Renewed January 24, 1916. Serial No. 74,064.

*To all whom it may concern:*

Be it known that I, THOMAS B. DIXON, a citizen of the United States, residing at New York, in the county of New York and State of New York, have invented certain new and useful Improvements in Telegraphy; and I do hereby declare the following to be a full, clear, and exact description of the same, such as will enable others skilled in the art to which it appertains to make and use the same.

My invention relates to telegraphy and comprises a novel system and apparatus particularly adapted for use on circuits of great retardation, such for example as long submarine cables.

For various reasons it is now customary to transmit messages over such circuits by dots and dashes which are distinguished from each other by relative position with respect to a variable zero; practical difficulties having prevented transmission, over long lines of high retardation, by means of dots and dashes, which are distinguished from each other by relative duration, as, for example, in the Morse system commonly used in land line telegraphy; notwithstanding the fact that the practical superiority of transmission by dots and dashes, distinguished from each other by relative duration, where such system is practicable, is well recognized. In the present system I have overcome the practical difficulties which have hitherto substantially prevented transmission, through lines of great retardation, by dots and dashes distinguished from each other by relative duration, instead of by relative position with respect to a zero. In my said system the transmitting means employed may be of familiar character, being preferably a machine transmitter whereby dots, dashes and spaces of standard lengths may be transmitted with uniformity; though hand transmission is not precluded. The receiving apparatus comprises an actuating element (specifically, in the apparatus hereinafter described, a delicate reflecting galvanometer) arranged to vary the action of a beam of radiant energy (specifically, a light beam) on a radio-electro-sensitive element (specifically, a selenium cell or group of such cells); such radio-electro-sensitive element in turn controlling a delicate relay, which customarily itself controls a sounder, recorder, repeater, or other suitable signal receiving means. The control of the said sensitive relay by the radio-electro-sensitive element, is customarily effected through an induction coil, so that the operation of the relay is effected by change of action of the beam of radiant energy on said element, without regard to the momentary position of such beam with respect to the true center of such element; although the direct control of the relay by the radio-electro-sensitive element is sometimes employed, as hereinafter described.

In systems of telegraphy such as above referred to involving the use of radio-electro-sensitive elements as described, in the transmission of messages by means of dots and dashes differentiated from one another by relative duration, trouble has been experienced heretofore from a so-called "variable lag", the reason for which will be explained hereinafter, and the result of which is to unduly shorten or "clip" dashes, and spaces greater than dots. In general, it may be said that such distortion of dashes and long spaces is due to the fact that, the coil of the line galvanometer being deflected a greater distance for dashes or long spaces than for dots or short spaces (hereinafter termed "element spaces"), said coil in its return movement tends to move, somewhat like a pendulum, with greater velocity, following such dashes or long spaces, than following dots or element spaces. To obviate this difficulty, according to my present invention, I provide, in connection with the said line galvanometer, variable retardation or damping means, controlled by a time element, for the purpose of making the velocity of return movement of the coil, or, at least, of its reflector, substantially the same in all cases whether the preceding signal has been a dot, or a dash, or a short or a long space. The fact that, in telegraph systems in which the several signals are distinguished from each other by relative duration, these signals (dots, dashes, or long or short spaces) have definite relative standard durations, which are particularly regular when machine transmission is employed, makes it practicable, and, by the means hereinafter described, particularly easy, to compensate automatically for the tendency of the galvanometer coil to return with varying velocities following signals of varying durations. In this way I am able to provide a very effective "working margin" since when the compensating means referred to is employed, the adjustment of travel of the beam of radiant energy may be such that said beam will travel over the entire width of the radio electro sensitive element, or group of such elements, employed, for each signal, so that said element works at all times at its maximum efficiency.

In this specification I have illustrated and described selenium cells as specific examples of radio-electro-sensitive elements, or radio-electric current varying devices, which may be employed, without limiting myself, however, from the employment of other radio-electric current varying devices, whether operated by light rays, heat rays, or other form of radiant energy, and whether the action of such rays be to increase or decrease the resistance of the substance employed; and I have illustrated and described a reflecting galvanometer as the actuating device for such radio-electro sensitive element, or radio-electric current varying device, without intending thereby to limit myself to any particular type of actuating device for the purpose.

Figure 2:
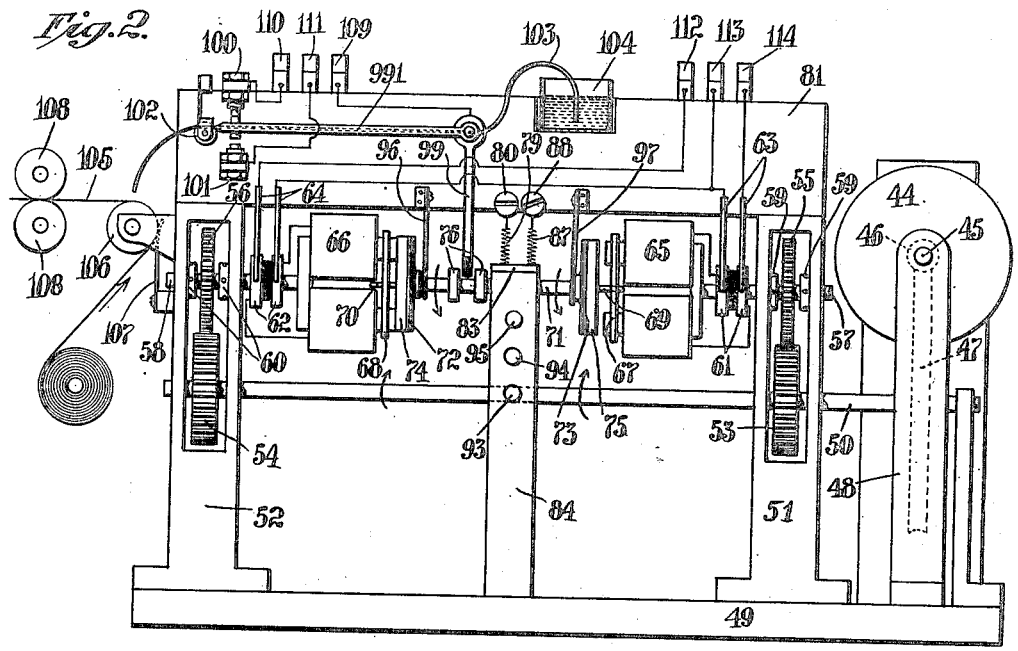
Figure 3:
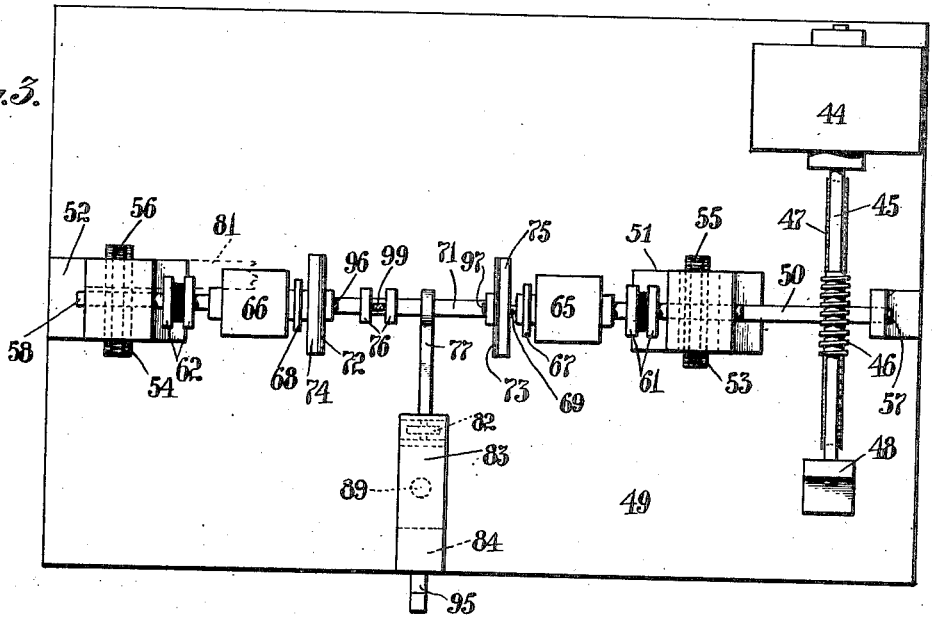

The objects of my invention are to improve telegraph systems and apparatus, particularly systems and apparatus adapted for use on circuits of high retardation; to make practicable in such circuits, transmission by dots, dashes and spaces distinguished from each other by relative duration; to increase the speed of transmission over such circuits; to increase the certainty of transmission over such circuits; to make the signals received more legible and more easily read or interpreted; to provide for automatic and reliable repetition of messages from one circuit to another; to obviate disturbance from variable zero of the circuit and variable lag of the receiving instruments employed; to improve the mounting and suspension of the mirror of the galvanometer; to control the velocity of movement of said mirror and compensate for tendency of the coil of the galvanometer to move with different velocities at different times; to limit the to-and-fro movement of said mirror so that it will always deflect the light beam controlled by it between certain predetermined limits only, even though the movements of its actuating coils vary widely with respect both to amplitude and velocity; to provide an improved arrangement of circuits and batteries for the selenium cells and the primary of the transformer or induction coil, whereby large current values in the secondary of said coil may be obtained; to provide an improved receiving instrument combining a telegraph ink marker, relay and time element arranged to equalize velocities of movement of the mirror; and in general, to simplify and improve radio-electric telegraph systems and apparatus. These objects are attained in the system and apparatus herein described and illustrated more or less diagrammatically in the drawings which accompany and form a part of this specification, in which:

Figure 1 is a diagrammatic-perspective view showing a cable circuit equipped with both transmitting and receiving apparatus, the latter of a type embodying my present invention; Fig. 2 shows a front elevation of an instrument employed in said receiving apparatus and combining in a single structure signal receiving and repeating means and a time element for controlling the motions of the galvanometer mirror; and Fig. 3 is a plan view of the said instrument with certain of the parts removed; Fig. 4 shows a detail elevation of the contact mechanism of the said instrument, the view being taken looking from the left of Fig. 2; Fig. 5 is a detail perspective elevation of the support for the galvanometer mirror, showing particularly the bearings for the needle points employed as pivots for the said support; Fig. 6 shows a perspective elevation of an electric damping device which may be employed, in connection with said mirror, as a drag. Fig. 7 is a diagrammatic view showing an alternative arrangement of circuits of the damping device of Fig. 6; and Fig. 8 is a similar view showing a further alternative arrangement of such circuits; Fig. 9 is a diagrammatic view showing the control of a relay by selenium cells and batteries without the intermediation of an induction coil. Fig. 10 is a diagrammatic view showing the control both of the retarding device of the mirror and the control of an electric drag, (such as shown for example in Fig. 6) by the contact mechanism, of the time element or time train shown in Figs. 2, 3, and 4. Fig. 11 is an enlarged detailed view showing the adjusting collars 59.

Referring now to Fig. 1, 1 is a pole changing transmitting relay constituting, in the diagram, a diagrammatic representation of transmitting means broadly, it being understood that the circuit of the actuating magnet of this relay will, in practice, be operated by a suitable circuit breaker, such as a hand key or a machine transmitter of one of various well-known types; said transmitting relay having a battery 2, of positive polarity, connected with its left or spacing contact stop, and a battery 3, of negative polarity, connected with its right or marking contact stop. The negative pole of battery 2 and the positive pole of battery 3 are connected to earth, as shown. A cable circuit 4, having the usual condensers 5 at each end, is connected at the transmitting end with the lever of transmitter 1 and at the receiving end with the specially constructed reflecting galvanometer 6, passing through its actuating coil 7 to earth. The coil 7 is provided with a torsional suspension, as shown, similar to the torsional suspension of the coil of a siphon recorder, whereby said coil is suspended between the pole pieces, 8, of an electromagnet. Two delicate fibers 9 connect the coil with two equalizers 10, these equalizers being each connected by a trace 11 to the mirror carrier 12 of mirror 13 and by a trace 14 to a drag or yielding device 15, both mirror carrier and drag being arranged to turn on a vertical axis. This drag, in the form shown in the figure, consists of a light cross-shaped object having two blades 16, each partly immersed in liquid contained in a reservoir 17. The mirror carrier 12 has attached rigidly to its lower end a small coil 18 whose axis coincides with that of the mirror carrier and whose function is to exert certain damping effects on the movements of the mirror and mirror carrier which will be fully described farther on. Coil 18 turns on its axis in a magnetic field produced by a magnet, the pole pieces 19 only of which are shown. Mirror carrier 12 and drag 15 are held firmly against needle points 20 and 21 by the taut traces 11 and 14, mirror carrier 12 and drag 15 each having, preferably, (see also Fig. 5) a bearing for the upper needle point shaped like a hollow cone, and having a vertical V-shaped lower bearing of considerable length, as shown in detail in Fig. 5. Constructing the upper and lower bearings in this way provides a support which prevents the drag and mirror carrier from gradually working downward by gravitation and also removes any difficulty in connection with needle points finding their centers. Obviously, the arrangement may be varied by placing the hollow cone bearings at the bottom and the V-shaped bearings at the top. When actuating coil 7 turns on its axis, it will be seen that both mirror carrier 12 and drag 15 will be caused to turn with it through the action of traces 11 and 14. I prefer to connect the trace fibers closer to the axis of mirror carrier than fibers 9 are to the axis of coil 7, so as to obtain the effect of causing the mirror carrier and the parts attached to it to have a comparatively large movement for a comparatively small movement of coil 7, the effect being the same in principle as if the coil transmitted motion to the mirror through multiplying gearing. I prefer to connect the trace fibers of the drag in the same manner. The rotation of the mirror carrier is limited by stop fibers 22 which are slightly slack when the mirror carrier is in the central position, one of them becoming taut and the other more slack as the mirror carrier turns on its axis from one extreme position to the other.

A beam 23 from a source of light 24, concentrated by condensing lenses 25, and given, preferably, a rectangular shape with respect to its cross section by a screen 26 having a rectangular window, is projected against the surface of the concave mirror 13, from which it is reflected, thence passing through a plano-convex cylindrical lens 27 to the faces of selenium cells 28. When the beam reaches the cells it is of approximately rectangular cross section, its size being such with relation to the surface of the cells and the space between them that when the mirror is in the central position a half or thereabout of the total cell surface is illuminated while the other half is not. I prefer to always employ the selenium cells in pairs, or in a plurality of such pairs, (two such pairs being shown in the drawings), so arranged and connected electrically, as hereinafter described, as to coöperate to produce a cumulative effect in the circuit influenced by the variations in illumination of the cells.

In practice, the adjustment of the drag 15 is preferably such that it offers somewhat greater resistance to the motion of the galvanometer coil 7 than does the mirror carrier 12, and therefore when the galvanometer coil first starts to move, the mirror carrier 12 and mirror 13 move with it, the drag 15 remaining stationary or nearly so, the equalizers 10 permitting this, and, in fact, causing the mirror to move with greater velocity than it would if the drag moved with the mirror and at a corresponding speed. As soon as one of the stop fibers 22 of the mirror is taut, the mirror comes to rest, and the drag begins to move so permitting the galvanometer coil to move until it comes to rest naturally. In return movement of the galvanometer coil, the mirror begins to move as soon as the coil does, and continues to move until arrested by its other stop fiber 22, the drag 15 then moving and so permitting the galvanometer coil to continue to move until it comes to rest naturally. This coöperation of the drag with the mirror and galvanometer coil permits the mirror to move throughout its entire range of movement for dots, dashes, or spaces, regardless of the variable duration of such signals and the consequent variable amplitude of movement of the galvanometer coil; the importance of which will be apparent later.

Referring now to the local circuits of the receiving apparatus, the negative pole of battery 29 connects with the two selenium cells on the left, the cells being connected in series with each other, and the positive pole of battery 30 connects with the two cells on the right, which are, likewise, in series with each other, so that normally the battery circuit is from the positive pole of battery 30 via conductor 31 through the right hand cells, conductor 32, the left hand cells, conductor 33 to the negative pole of battery 29, through battery 29 and conductor 34 to the negative pole of battery 30.

35 is an induction coil or transformer having the terminals of its primary coil 36 connected to conductors 32 and 34 by conductors 37 and 38.

Assuming for the moment the position of the light beam to be central so that the cells on each side are half illuminated and further assuming the cells on the right to be equal in resistance to those on the left and the potentials of batteries 29 and 30 also to be equal, no current can flow through conductors 37 and 38 and the primary coil of the induction coil since the potentials of the batteries oppose each other as to coil 36. When, however, the light beam is deflected to the left from the central position, to the position shown in Fig. 1, it fully illuminates the cells on the left and does not illuminate those on the right, thereby decreasing the resistance of the cells on the left and increasing the resistance of the cells on the right, the effect being to cause a flow of current through the primary coil 36 via conductors 37 and 38, which will continue as long as the resistances of the cells remain unequal. The rise of current flow through the primary of induction coil 35 induces a current in the secondary coil 39 which passes via conductors 40 through the actuating coil of relay 41. Relay 41 responds to current reversals and consists of a coil of fine wire delicately suspended or pivoted between the poles of a magnet and carrying a contact arm playing between contact stops, and electrically controls the electromagnets 65 and 66 of receiving instrument 43, fully described farther on, this instrument being shown diagrammatically only, in Fig. 1. With the apparatus in the position indicated in the figure, the transmitter 1 is in the normal or spacing position, and a circuit from the positive pole of battery 2 is completed through the right contacts of transmitter 1, cable circuit 4, and coil 7 of galvanometer 6 to earth, thence through the earth to the negative pole of the battery. The current from battery 2 has turned the coil 7 on its axis from right to left, this movement of the coil having moved mirror 13 from right to left so as to deflect the light beam from right to left, this having caused the resistance of selenium cells to vary, as above described, and having caused a current from battery 29 to flow through the primary 36 of induction coil 35, and so having caused an induced current to flow through secondary coil 39 of induction coil 35, the contact lever of relay 41 having thereby been deflected to the left, thereby closing the circuit of battery 42 and magnet 66. If, now, the transmitter be operated so that battery 3 is cut into the cable circuit in place of battery 2, a negative current will flow through the cable circuit, turning coil 7 from left to right. It is to be understood that while the condensers 5 would prevent a continuous flow of current for any considerable period of time, (the current actually flowing only while the cable and condensers are charging and discharging), yet, for the time periods represented by the signals of the Morse code, the current from battery 2 or 3 may be assumed to flow continuously. When the coil 7 turns on its axis it carries mirror carrier 12 together with mirror 13 and coil 18 with it until stopped by one of stop fibers 22 becoming taut, and carries drag 15 with it, the result being to completely illuminate the cells on the right and leave those on the left without illumination. (It may be here pointed out, however, that the adjustment can be such, if desired, that while the cells on one side are fully illuminated those on the other side may remain partially illuminated.) This variation in illumination will cause a change in resistance of the selenium cells so that current from battery 30 will flow through the primary of the induction coil in opposite direction to that just described. It will be seen that the current induced in the secondary of the induction coil will be the resultant of the total variation of current of the two batteries 29 and 30, being double what it would be, other things being equal, with a single battery and a single selenium cell or group of cells. The current induced in the secondary coil operates relay 41, causing its contact lever to make contact with its right contact point so as to interrupt the circuit of battery 42 and magnet 66 and complete the circuit of battery 42 and magnet 65. The return of transmitter 1 to its normal or spacing position and the consequent operation of coil 7 and mirror 13 will cause the light beam to again be deflected to the left, thereby illuminating the left group of cells and leaving those on the right unilluminated, the resistance variations in the selenium cells causing an induced current in the secondary of the induction coil of opposite direction to that resulting from the movement of the light beam from left to right, the effect being to again operate relay 41 and return its contact lever to its left hand or spacing position and to reëstablish the circuit of battery 42 through magnet 66.

Before proceeding further with description of apparatus illustrated in Fig. 1 it will be necessary to describe in detail the receiving instrument 43, illustrated in Figs. 2, 3 and 4, which comprises means for recording and repeating the signals, also a time element controlling the damping of the galvanometer mirror. Referring now to these figures, 44 is a motor whose shaft 45 carries a worm 46 engaging with a worm wheel 47, the shaft having a bearing in support 48 which rests on a base 49. Worm wheel 47 is keyed to a shaft 50 having bearings in supports 51 and 52 which also rest on the base 49. The shaft 50 carries two gear wheels 53 and 54 which are keyed to it and engage with gear wheels 55 and 56, which are keyed to shafts 57 and 58 having bearings in supports 51 and 52. Shaft 57 carries two collars 59 and shaft 58 two collars 60, the purpose of which is to permit of longitudinal adjustment of shafts as well as to hold said shafts in place. Supports 51 and 52 are shaped as shown in Fig. 2 more particularly, being hollowed out to allow spaces for the said gear wheels and collars. Shafts 57 and 58 each carry a drum of insulating material, the drum on shaft 57 carrying conducting rings 61 and that on shaft 58, conducting rings 62, said pairs of rings engaging respectively with two pair of brushes, 63 and 64, and connecting electrically with electromagnets 65 and 66 of two electric clutches, which magnets are also mounted on shafts 57 and 58, the ends of the shafts being secured to the yokes of the magnets. The said drums, rings and magnets revolve with their shafts continuously owing to the gear wheels which are driven by motor 44. Across the poles of magnets 65 and 66 are cross pieces 67 and 68 made of non-magnetic material, the function of these cross pieces being to furnish bearings for journals 69 and 70 of a shaft 71. The shaft 71 has keyed to it near its ends two disks, 72 and 73, which may be of non-magnetic material, and which have fastened to them soft iron rings 74 and 75, these rings having, preferably, a thin film of non-magnetic material, on their sides next their magnet poles, for the purpose of overcoming the effects of residual magnetism and thereby making the instrument capable of more rapid operation. Magnet 65 and ring 75 constitute an electric clutch for transmitting motion from shaft 57 to shaft 71, and magnet 66 and ring 74 constitute a similar electric clutch for transmitting motion from shaft 58 to shaft 71. Shaft 71 also carries two collars 76, adjustable longitudinally, and a contact lever 77, shown in detail in Fig. 4. This lever is not made fast to shaft 71 but is held against it by a spring 78, the resulting friction being sufficient to cause the lever to turn with the shaft, in the direction indicated by dart, when the shaft turns, against the tension of retractile spring 79, which is attached to lever 77, and to an adjustment screw 80 which is mounted on a beam 81, of insulating material, the beam resting on supports 51 and 52. Lever 77 is normally drawn upward by spring 79 and rests against a roller 82 having bearings in a lug 83 which projects from a post of insulating material 84. A contact lever 85, pivotally mounted on a lug 86 attached to post 84, is pulled upward normally by a spring 87, the upper end of which is held by an adjustment screw 88 mounted on beam 81. The upward travel of lever 85 is limited by a stop screw 89. The downward movement of lever 85 as well as of lever 77, is limited by a contact screw 90 carried by a conducting piece 91. Lever 77 is connected electrically by means of a wire 92 with a binding post 93, contact screw 90 is connected by means of pieces 91 with a binding post 94, and lever 85, by means of lug 86, with a binding post 95. It will be seen that a downward movement of lever 77 due to turning with shaft 71, if continued long enough, will cause the contact point of the lever to engage with the upper contact point of lever 85, whereupon lever 85 will be carried downward until, if the movement continue long enough, lever 85 engages with stop 90, when its motion, as well as that of lever 77, will be arrested, the action of spring 78, however, permitting shaft 71 to continue revolving.

96 and 97 are flat clutch springs mounted on beam 81 and the lower ends of which press against the hubs of disks 72 and 73, respectively, spring 96 tending to move disk 72 from right to left so as to carry to the left shaft 71 and the members fixed thereto with it, spring 97 acting similarly but in the reverse direction and pressing against the hub of disk 73. The function of these springs is to assist in overcoming the inertia of shaft 71 and the members carried by it in its longitudinal movements. Mounted also on beam 81 are the brushes 63 and 64, above referred to, and pivotally mounted on the beam is a lever 99 having a vertical arm that rests between the two collars 76 and a horizontal arm 991 that carries two contact points adapted to make contact alternately with contact stops 100 and 101. The end of horizontal lever 991 is wedge shaped and engages with a jockey 102 which tends to hold said lever firmly against whichever contact stop it may be in contact with. Lever 99 carries a siphon tube 103, the upper end of which dips in an ink reservoir 104, its lower end as it moves up and down with an arm 991 making a record of the signals on a strip of moving tape 105 which is guided by a roller 106 and spring 107 attached to lugs of support 52, the tape being pulled from right to left by two revolving rollers 108 driven by a suitable motor, not shown. Lever 99 is connected by a wire with a binding post 109, contact stops 100 and 101 to binding posts 110 and 111 respectively, and the signals may be automatically repeated, where required, by means of lever 99 and contact points 100 and 101, the circuits for repeating the signals into a second cable 115 being shown in Fig. 1. The two outer brushes of brush pairs 63 and 64, respectively, connect with binding posts 112 and 114, and the two inner brushes with a common binding post 113, as shown.

Normally, motor 44 causes shaft 50 and gear wheels 53 and 54 to rotate in the direction indicated by arrows in Fig. 2, i. e., in an anti-clockwise direction, looking from the left of Fig. 2, the upper gear wheels 55 and 56 and members rotated by them turning in the opposite direction, as indicated by the upper group of darts.

In the drawings it is assumed that magnet 66 has just been energized by current from battery 42, (see Fig. 1) so that ring 74 is attracted to and held firmly by its poles. This will cause the ring to start to revolve with the magnet and carry with it lever 77 which, if the magnet remain energized for a sufficient time, will make contact with lever 85 and carry said lever with it until both levers are stopped by stop 90, after which, if the magnet still remain energized, ring 74 will continue to turn with the magnet, the action of spring 78 permitting this. As soon as magnet 66 is deënergized, owing to the operation of relay 41, spring 97 will act to move the ring 74 away from the poles of the magnet, and springs 79 and 87 return levers 77 and 85 to their normal positions; and when magnet 65 becomes energized the ring 75 will be attracted to the poles of said magnet, turning with it and putting spring 96 in a state of tension, and causing shaft 71 to rotate and so to move lever 77 into contact with lever 85, and then to move the two levers together, provided magnet 65 remains energized long enough. When magnet 65 is again deënergized spring 96 causes shaft 71 to start to move from right to left, magnet 66 again attracting ring 74 as soon as reënergized so as to complete the travel of the shaft. This arrangement of magnets and springs for operating shaft 71 is extremely efficient since the springs act at the moment the rings are released and at a time when the magnetic pull from the opposite magnet is weakest owing to distance from its ring.

It will now be clear that the apparatus may be so adjusted that if a series of dots only be sent over the line circuit the shaft 71 and members attached to it will vibrate longitudinally between the poles of magnets 65 and 66, and that the speed of the driving motor 44 may be such that for dots and the element spaces following them lever 77 will always be released and returned to normal before it can move far enough to engage with lever 85, but that for dashes, magnet 65 being then energized for a longer time than it is for dots, the lever will move downward sufficiently to engage with lever 85 before being released and returning to normal. Also, that for the longer spaces, which are usually of two kinds, letter and word, the former generally having the length of the dash, while the latter has something like twice that length, the lever 77 will move sufficiently to make contact with lever 85 before returning to normal, and for word spaces will move far enough to bring lever 85 in contact with stop 90. Bearing in mind that the effect of spacing currents sent over the line or cable circuit is always to energize magnet 66 while that of marking currents is to energize magnet 65, it will be apparent that if it should be required that dashes and letter spaces be of different lengths this result may be easily obtained by making the gear ratio of the gear wheels 53 and 55, and 54 and 56, unequal, these being shown as equal in the drawings. The adjustment for word spaces is obtained in any case by means of stop screw 90.

Referring again to Fig. 1, and assuming first that a regular series of dots are being sent over the line, the contact lever of relay 41 will vibrate regularly between its contact points so as to alternately close the circuits of magnets 65 and 66, the corresponding longitudinal vibration of shaft 71 and the members carried by it producing no effect respecting the signals other than the recording of the dots on the tape and their repetition into the second cable circuit, 115. If, now, a dash be sent so that lever 77 moves far enough to make contact with lever 85, resistances 116 and 117 are cut into the circuit of coil 18, this coil being normally shunted by a high resistance 118. At the termination of the dash, assuming for the moment that resistances 116 and 117 had not been cut in, the coil 18 and mirror would return to their spacing side with a much higher velocity of movement than for the spacing interval following a dot of the series just assumed, but the cutting in of resistances 116 and 117 has the effect of causing coil 18 to move more sluggishly, than it would do if free, in response to the spacing current following the dash, owing to the self induced currents of coil 18 tending to oppose its motion, and resistances 116 and 117 are so proportioned that the damping effect of the self induced currents of coil 18 will so reduce the velocity of movement of the coil that it will be the same or approximately the same for the space following the dash as for the spaces following dots. Assuming the dash to have terminated and a letter space to be the next sent, lever 77 will have returned to normal and with the reënergizing of magnet 66 lever 77 will again make contact, before the termination of the letter space, with lever 85, so as to again cut resistances 116 and 117 into circuit with coil 18, the effect being to cause coil 18 to move with the same relative sluggishness at the termination of the letter space as at the termination of the dash just described. If, after a dot or dash, a word space be sent, the levers 77 and 85 will move until lever 85 engages with contact stop 90, the result of this being to short circuit resistance 116, and since this will reduce the total resistance shunting coil 18 still more, the coil would tend to move more sluggishly after the termination of a word space than after the termination of the dash or letter space, but for the fact that the coil 7 tends to move with much greater velocity following a word space than it does following a dash or letter space, just as it tends to move with much greater velocity following a dash or letter space than it does following a dot. The greater damping effect following a word space will, therefore, only have the effect of causing the velocity of movement of coil 18, etc., to be approximately the same following a word space that it is following a dash or letter space, provided that the resistances 116 and 117 are properly proportioned to each other.

Owing to the detrimental effects of "variable lag" in the circuits of relay 41, fully described farther on, it is highly important that the velocity of movement of the light beam, as it sweeps over the faces of the selenium cells, shall be as nearly as possible the same for all signals. I, therefore, so proportion resistances 116 and 117 that they will exercise just enough damping effect on coil 18 to insure its moving always with approximately the same velocity irrespective of the tendency of actuating coil 7, to move with greater velocity after dashes or word spaces than after dots or element spaces, the drag 15 moving with increased velocity when coil 18 exercises its damping effect. Shunt 118 is intended to exercise only a very slight but a constant damping effect for the purpose of steadying the mirror against any false movements due to vibration of supports or other cause.

I will now describe the "variable lag" above referred to. This, unless compensated for in some way, tends to shorten, or "clip", the dashes and longer spaces of the Morse code in their reproduction on a relay or other receiving device controlled by radio-electric apparatus such as that herein described. To operate any relay the current must first reach a certain minimum value, this value being generally termed the "figure of merit" of the instrument. Where the current or current variation resulting from the variation in resistance of a selenium cell due to changes in illumination is utilized to operate a relay or other receiving device a serious difficulty is encountered, unless compensating means, such as above described, for example, be employed, because of the fact that the resistance variation, and consequently the current variation, lags behind the variation in illumination, requiring some time to reach its final value. If, therefore, with a given change in illumination taking place in a given time, there is a certain lag in the relay's response, it follows that with a greater change in illumination taking place in the same time, or with the same change in illumination taking place within a shorter time period, the lag is correspondingly less. Taking, for example, the velocity of movement of light beam 23 for the element space following a dot as a standard for comparison, it is found that, if no compensating means be employed, the velocity of movement of the beam for the element space following a dash is considerably greater and a proportionately larger surface area of the selenium cells has its illumination varied during the same period of time, this greater velocity of movement for the same time interval being due to the greater charge of the receiving condenser following the dashes and other factors, and causing a correspondingly more rapid change in the resistances of selenium cells and more sudden variations in the circuits controlling relay 41, causing the relay to respond the more quickly.

In the arrangement of apparatus above described all detrimental effects of "variable lag" are entirely eliminated, the velocity of movement of the light beam being practically the same, after dots, dashes, or spaces, long or short, of the standard lengths used in telegraph transmission.

Instead of using a liquid drag such as shown in Fig. 1, I may use various other forms of drag, for example, a magnetic drag such as shown in Fig. 6. The construction of this magnetic drag is very similar to that of the damping device of the mirror support 12, and comprises a coil 119 mounted to move through a magnetic field produced by magnet 120, the terminals of this coil being shunted through a variable resistance 121. It will be apparent that by varying this resistance 121, the strength of the currents induced in coil 119 by the movement of said coil through the magnetic field, which currents tend to oppose the movement of said coil, may be varied as desired, and so the retarding influence of this magnetic drag may be varied as desired.

In Fig. 7 I show an alternative arrangement of circuits for the damping coil 18 of the mirror. In this figure, 122 designates a battery for coil 18 having a resistance 123 in circuit. such resistance 123 being shunted by a greater resistance 124. Normally battery 122 and resistance 123 are not in circuit with the coil, since the circuit of said battery is connected to the stop screw 90; the circuits of the coil 18 comprising resistances 116 and 117 and a shunting resistance 118, and being controlled by contact levers 77 and 85, in the manner previously described with reference to Fig. 1. When contact levers 77 and 85 are brought into electric connection with stop 90, as they are when a word space or long dash occurs, battery 122 is cut into the circuit of coil 18, a portion of the current from this battery supplementing the damping effect of the self induction of coil 18, by tending to cause the coil to rotate in a direction opposite that in which galvanometer coil 7 tends to move it. In this arrangement of circuits shown in Fig. 7, resistance 116 is cut out of circuit during transmission of dashes and letter spaces, as described with reference to Fig. 1.

In Fig. 8 I show a further alternative arrangement of circuits for the damping coil 18 of the mirror, wherein two batteries 125 and 126, each provided with a resistance 123 and shunted resistance 124, as described with reference to Fig. 7, are employed in local circuit controlled by contact points of lever 991; the one battery or the other, of batteries 125 and 126, being in the circuit of coil 18, according to the position of said lever 991; these batteries being of opposite sign. Resistances 116 and 117 are employed the same as in Fig. 7, and such resistances are controlled in the same way by contact levers 77 and 85. It will be seen that in this circuit arrangement, the current of one battery opposes the movement of coil 18 during spacing movements of the mirror, and the current of the other battery opposes movement of such coil during marking movements of the mirror.

In case, during transmission of signals in the system, as above described, it becomes necessary to change the normal rate of transmission, so changing the absolute length of dots, dashes and spaces, the speed of motor 44 will be correspondingly changed and the damping action of coil 18 will be readjusted, if necessary, by adjustment of its controlling resistances, in accordance with the new absolute length of dots, dashes and spaces; also, if necessary, screws 89 and 90 will be adjusted.

From what has been said previously, regarding the relative actions of the galvanometer coil 7, mirror 13, and drag, it will be clear that the mirror begins to move as soon as the coil 7 begins to move, whether the coil, at the beginning of such movement, is at its central position, or at any other position, and that the permitted travel of the mirror is preferably such that, even for the shortest dots to be transmitted, the beam of light will move from one extreme position to the other, and will there remain until the galvanometer coil starts its return movement, whereupon the beam of light will move back to its other extreme position. Since the movements of the beam of light are the same in amplitude for dots, dashes, or spaces of whatever light, and since these movements begin with the beginning of movement of the galvanometer coil, whatever be the position of that coil at the beginning of such movement, it will be clear, that my improved receiving instrument adjusted as described, is free from disturbances due to variation of the zero of the cable line, and therefore that the inductive control of the relay 41 by the radio-electro-sensitive element or elements is unnecessary. Therefore in Fig. 9 I have indicated circuits for the direct control of relay 41 by the radio-electro-sensitive elements 28, which circuits are the same as the corresponding circuit shown in Fig. 1, except that the induction coil is omitted, circuit conductors 37 and 38 leading direct to the armature coils of relay 41.

In Fig. 10 I illustrate how the contact mechanism of the time train shown in Figs. 2, 3 and 4 may control simultaneously both the retarding or speed-controlling device of the mirror 13, and an electric drag such as shown in Fig. 6. The contact mechanism of the time train, indicated diagrammatically in this figure, is the same as shown in Fig. 4 and as illustrated diagrammatically in Figs. 1, 7 and 8, except that for the contact stop 90 a spring actuated contact lever 90$^a$ is substituted; this contact lever 90$^a$ being arranged to coact with a contact stop 127. The circuits whereby the retarding device of the mirror is controlled are substantially the same as above described with reference to Fig. 1. Coil 119 of the electric drag is included in a circuit 128 containing a suitable resistance 129 and passing through contact lever 85 and a contact point 130 co-acting therewith. This circuit is shunted normally by a high resistance 131, and also by another circuit 132 passing through lever 90$^a$ and its stop 127, and containing a further resistance 133. It will be seen that, with the parts arranged as described, during the transmission of a dash or letter-space, resistance 129 is cut out of the circuit of coil 119 by the coming together of levers 77 and 85 and consequent breaking of contact between lever 85 and contact 130; the resistance which coil 119 offers to the motion of the galvanometer coil to which the drag is connected being thereby reduced. It will also be seen that during long dashes or word-spaces, when lever 77 moves lever 85 into contact with lever 90$^a$ and breaks connection between lever 90$^a$ and stop 127, circuit 132 is broken and so resistance 133 is cut out of the circuit of coil 119, leaving said coil shunted only by resistance 131. It follows from this arrangement that the drag offers maximum resistance, and so causes maximum movement of the reflector 13 in proportion to the movements of the galvanometer coil 7, following dots and element spaces; that following dashes and letter-spaces the resistance offered by the drag becomes less as the resistance offered to the movement of the reflector 13 becomes greater; and that this condition obtains to still greater extent following transmission of long dashes or word-spaces. The two moving coils, 18 and 119, therefore, coöperate, through the equalizing fiber connection illustrated in Fig. 1, to control as desired the speed of movement of the reflector without limiting materially the movement of the galvanometer coil 7; for as the resistance to the movement of coil 18 becomes greater the resistance offered by the drag 119 becomes less.

The following is a brief description of the operation of my improved telegraphic receiving apparatus, as illustrated particularly in Fig. 1: First, assuming that transmitter 1 is in the normal or spacing position and that the light beam is to the left so as to illuminate the left hand group of selenium cells, the closing of the controlling circuit of this transmitter will take battery 2 from the line circuit and will connect battery 3 to that circuit, thereby reversing the polarity of the line circuit and causing the coil 7, mirror 13 and drag 15 to turn from left to right, so as to reflect the light beam 23 from left to right, until the movement of the mirror 13 is arrested by one of the stop fibers 22. The movement of the light beam causes a current variation in the primary of induction coil 35, this current variation inducing a current in secondary coil 39 of proper direction to operate relay 41, causing the contact lever of said relay to leave its left hand or spacing contact stop and to make contact with its right hand or marking contact stop, thereby breaking the circuit of battery 42 and magnet 66 and completing the circuit of said battery through magnet 65, thereby closing one of the electric clutches of the time train, and operating lever 991 and the ink marker carried thereby so as to record the signal on the tape 105. The opening of the controlling circuit of transmitter 1 will cut out battery 3 and will reëstablish the circuit of battery 2 in the line, the light beam being again reflected to the left, causing a variation of current in the primary of induction coil 35 which will induce a current in the secondary of that coil of proper direction to deflect the armature of relay 41 to the left or to its spacing contact point, magnet 65 being thereby deënergized and magnet 66 being energized, thereby opening the clutch of the time train previously closed and closing the clutch of that time train controlled by magnet 66, besides again operating lever 991 and raising its ink marker from the tape 105. In case either a marking signal or a spacing signal continues beyond the predetermined length for a dot or element space, contact will be closed between contact lever 77 of the time train and contact lever 85 thereby increasing the resistance offered to the motion of the mirror, 13, during further movement of said mirror; and if either a marking or a spacing signal continues beyond the predetermined duration for an ordinary dash or letter-space, contact will be closed between lever 85 and contact 90, thereby increasing still further the resistance offered by coil 18 to the motion of the mirror 13. By the means described, the velocity of movement of the light beam is caused to be always approximately the same for all signals, regardless of varying amplitude of movement of the galvanometer coil 7, but without interfering with freedom of motion of the ganvanometer coil 7 to the extent determined by the strength and duration of the current pulses operating said coil. Distortion of signals due to varying lag of the circuits controlling relay 41 is thereby eliminated and distortions due to varying zero of the cable line 4, such as might exist if the motion of the galvanometer coil 7 were materially restricted, are avoided.

In the following claims I use the term illumination in a broad sense to include the actions of radiant energy rays of any character on the radio-electro-sensitive device; in other words, the word illumination is used to include the action of heat rays and other radiant energy rays, as well as light rays.

What I claim is:—

1. The method of reproducing telegraphic electric signals, transmitted through a circuit of great retardation and distinguished in character by difference in duration, which consists in causing said signals to vary the action of radiant energy on a radio-electro-sensitive element in an electric circuit, and causing the electric quality of said element to begin to vary at substantially the same point in all signals, and to vary at approximately the same rate for each signal, without regard to variation of duration of the different signals.

2. The method of reproducing telegraphic electric signals, transmitted through a circuit of great retardation and distinguished in character by difference in duration, which consists in causing said signals to vary the action of radiant energy on a radio-electro-sensitive element in an electric circuit, and causing the electric quality of said element to vary at approximately the same rate and to approximately the same extent for each signal, without regard to variation of duration of the different signals.

3. The method of reproducing telegraphic electric signals, transmitted through a circuit of great retardation and distinguished in character by difference in duration, which consists in causing said signals to move a beam of radiant energy across the surface of a radio-electro-sensitive element in an electric circuit, and causing the area of such surface exposed to said beam to vary, during movement of said beam, and causing said beam to begin to move at substantially the same point in all signals and to move at approximately the same rate for each signal, without regard to variation of duration of the different signals.

4. The method of reproducing telegraphic electric signals transmitted through a circuit of great retardation and distinguished in character by difference in duration, which consists in causing said signals to move a beam of radiant energy across the surface of a radio-electro-sensitive element in an electric circuit, and causing the area of such surface exposed to said beam to vary, during movement of said beam, and causing said beam to move at approximately the same rate and to approximately the same extent for each signal, without regard to variation of duration of the different signals.

5. The method of reproducing telegraphic electric signals, transmitted through a circuit of great retardation, which consists in causing each of said signals to change the illumination of a radio-electro-sensitive element included in an electric circuit, from substantially complete illumination to substantially no illumination, or vice versa, according as the signal be a marking signal or a spacing signal, and by the resulting change in electric quality of the said element, effecting the control of signal reproducing means.

6. The method of reproducing telegraphic electric signals, transmitted through a circuit of great retardation, which consists in causing each of said signals to change the illumination of one of two radio-electro-sensitive elements, each of which is included in an electric circuit, from substantially complete illumination to substantially no illumination, and to change the illumination of the other said element from substantially no illumination to substantially complete illumination, irrespective of variation of zero of the said circuit, and by the resulting change in electric quality of said elements, effecting the control of the signal reproducing means.

7. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, and retarding means for retarding the motion of said second member.

8. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, retarding means for retarding the motion of said second member, and means regulating such retardation arranged to increase the retardation when the amplitude of movement of said actuated member is relatively great.

9. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, and velocity-regulating means controlling the motion of said second member.

10. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, and velocity-regulating means controlling the motion of said second member, and comprising means for maintaining the velocity of said member substantially the same regardless of the variation in amplitude of movement of said first member.

11. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, and velocity-controlling means for said second member comprising timing means.

12. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, retarding means controlling the motion of said second member, and timing means arranged to make the retardation greater for long signals than for short signals.

13. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, retarding means for retarding the motion of said second member, a time train, and means operated thereby for increasing the retardation if the signal exceeds a predetermined minimum in duration.

14. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, retarding means for retarding the motion of said second member, a time train, and means operated thereby for increasing the retardation if the signal exceeds a predetermined minimum in duration and for further increasing the retardation if a signal exceeds a further predetermined limit in duration.

15. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, electric damping means, controlling the motion of said second member, and comprising a coil arranged to move in a magnetic field, and means for decreasing the resistance in the circuit of said coil when signals exceed a predetermined duration.

16. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, electric damping means, controlling the motion of said second member, and comprising a coil arranged to move in a magnetic field, and means for decreasing the resistance in the circuit of said coil when signals exceed a predetermined duration and for further decreasing the resistance in the circuit of said coil when signals exceed a further limit of duration.

17. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means connecting said members permitting motion of the actuated member after the second member has been arrested, damping means for said second member comprising a coil arranged to move in a magnetic field with said second member, a time mechanism, and contact means controlled thereby arranged to decrease resistance in the circuit of said damping coil when a signal has exceeded a predetermined minimum.

18. In a radio electric relay, the combination of a source of illumination, a selenium cell, a galvanometer adapted to deflect a beam of light from said source of illumination across said cell, and having a rotatable actuated member and another rotatable member separately mounted and operating means controlling the deflection of said beam of light, means for limiting the motion of said second member, means connecting said members permitting motion of the actuated member after the second member has been arrested, and velocity-controlling means controlling the velocity of said second member and comprising timing means and means operated thereby for retarding the motion of said second member when signals exceed a predetermined duration.

19. In a radio electric relay, the combination of an actuated member adapted to be mounted in a magnetic field and to be controlled in its movements by signals in an electric circuit, a second member separately mounted and comprising means for varying the action of radiant energy on a radio-electro-sensitive element, a drag, and means connecting said actuated member to said second member and to the drag comprising equalizing levers, traces connecting said levers to said actuated member, and traces connecting each said lever both to the second member and to the drag.

20. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means tending to return said actuated member to normal position, a drag, means connecting said actuated member both to said second member and to said drag, and retarding means for said second member.

21. In a radio electric relay, the combination of a radio-electro-sensitive element, and a galvanometer having an actuated member mounted in a magnetic field and controlled in its movements by signals in an electric circuit, and having also another movable member separately mounted and comprising means for varying the action of radiant energy on said radio-electro-sensitive element, means tending to return said actuated member to normal position and exerting a variable tendency to that end according to the amplitude of movement of said actuated member, a drag, means connecting said actuated member both to said second member and to said drag, retarding means for said second member, and means affected by varying amplitude of movement of said actuated member, controlling said retarding means.

22. In a radio electric relay, the combination of a radio-electro-sensitive element, and a galvanometer having an actuated member mounted to move freely in a magnetic field and controlled in its movements by signals in an electric circuit and provided with spring means tending to return it to normal position when deflected therefrom, said galvanometer also comprising a second member movably mounted and provided with means for varying the action of radiant energy on said radio-electro-sensitive element and with stops limiting its movement, connections between said second member and actuated member permitting free movement of the actuated member after movement of said second member has been arrested, retarding means for said second member, and means variably affected by varying amplitude of movement of said actuated member, controlling said retarding means.

23. In a radio electric relay, the combination of a radio-electro-sensitive element, and a galvanometer having an actuated member mounted to move freely in a magnetic field and controlled in its movements by signals in an electric circuit and provided with spring means tending to return it to normal position when deflected therefrom, said galvanometer also comprising a second member movably mounted and provided with means for varying the action of radiant energy on said radio-electro-sensitive element and with stops limiting its movement, connection between said second member and actuated member permitting free movement of the actuated member after movement of said second member has been arrested, retarding means for said second member, and timing means controlling said retarding means in accordance with varying duration of signals.

24. The combination of a radio-electro-sensitive element, a galvanometer adapted to vary the action of radiant energy thereon and comprising retarding means controlling the rate of change of action of radiant energy, a relay controlled by said radio-electro-sensitive element, and a power-driven mechanism, controlling the action of said retarding means, comprising electric clutch means controlled by said relay.

25. The combination with a radio-electro-sensitive element, a galvanometer adapted to vary the action of radiant energy thereon and comprising electrically-controlled retarding means controlling the rate of change of action of radiant energy, a relay controlled by said radio-electro-sensitive element, contact means controlling said retarding means comprising a movable contact member, a power driven member, and an electric clutch interposed between said power driven member and contact member, and controlled by said relay.

26. The combination with a radio-electro-sensitive element, a galvanometer adapted to vary the action of radiant energy thereon and comprising electrically-controlled retarding means controlling the rate of change of action of radiant energy, a relay controlled by said radio-electro-sensitive element, contact means controlling said retarding means comprising a movable contact member, a power driven member, and two electric clutches interposed between said power driven member and contact member, and controlled by opposite contacts of said relay.

27. The combination with a radio-electrosensitive element, a galvanometer adapted to vary the action of radiant energy thereon and comprising electrically-controlled retarding means controlling the rate of change of action of radiant energy, said retarding means comprising a coil arranged to move in a magnetic field, a relay controlled by said radio-electro-sensitive element, contact means controlling resistance in circuit with said coil, and means for operating said contact means comprising an electric clutch controlled by said relay, said contact means arranged to reduce the resistance in the circuit of said coil after said clutch has remained closed a predetermined length of time.

28. The combination with a radio-electro-sensitive element, a galvanometer adapted to vary the action of radiant energy thereon and comprising electrically-controlled retarding means controlling the rate of change of action of radiant energy, said retarding means comprising a coil arranged to move in a magnetic field, a relay controlled by said radio-electro-sensitive element, contact means controlling resistance in circuit with said coil, and means for operating said contact means comprising two electric clutches controlled by opposite contacts of said relay, said contact means arranged to reduce the resistance in the circuit of said coil after either clutch has remained closed a predetermined length of time.

In testimony whereof I affix my signature in the presence of two witnesses.

THOMAS B. DIXON.

Witnesses:
WILLIAM B. SHELTON,
H. M. MARBLE.